United States Patent
Lacy et al.

[11] Patent Number: 6,111,844
[45] Date of Patent: *Aug. 29, 2000

[54] QUALITY DEGRADATION THROUGH COMPRESSION/DECOMPRESSION

[75] Inventors: John Blakeway Lacy, Warren; James H. Snyder, North Plainfield, both of N.J.

[73] Assignee: AT&T Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/888,009

[22] Filed: Jul. 3, 1997

[51] Int. Cl.$^7$ ........................................ G11B 7/00
[52] U.S. Cl. ........................................ 369/124.06
[58] Field of Search ................. 369/59, 84, 60, 369/47, 48, 124.06; 360/8, 15

[56] References Cited

U.S. PATENT DOCUMENTS

| | | | |
|---|---|---|---|
| 4,851,931 | 7/1989 | Parker et al. | 360/15 |
| 5,040,217 | 8/1991 | Brandenburg et al. | 704/226 |
| 5,488,665 | 1/1996 | Johnston et al. | 381/2 |
| 5,535,290 | 7/1996 | Allen | 382/250 |

FOREIGN PATENT DOCUMENTS

| | | |
|---|---|---|
| 0717338A1 | 6/1996 | European Pat. Off. . |
| 0797313A2 | 9/1997 | European Pat. Off. . |
| WO 96/18191 | 6/1996 | WIPO . |

*Primary Examiner*—Thang V. Tran

[57] ABSTRACT

A method for recording media content onto a storage device, such as a compact disk, in which a master version of a media content is first compressed, then decompressed prior to recording the compressed-decompressed media content onto the storage device.

4 Claims, 1 Drawing Sheet

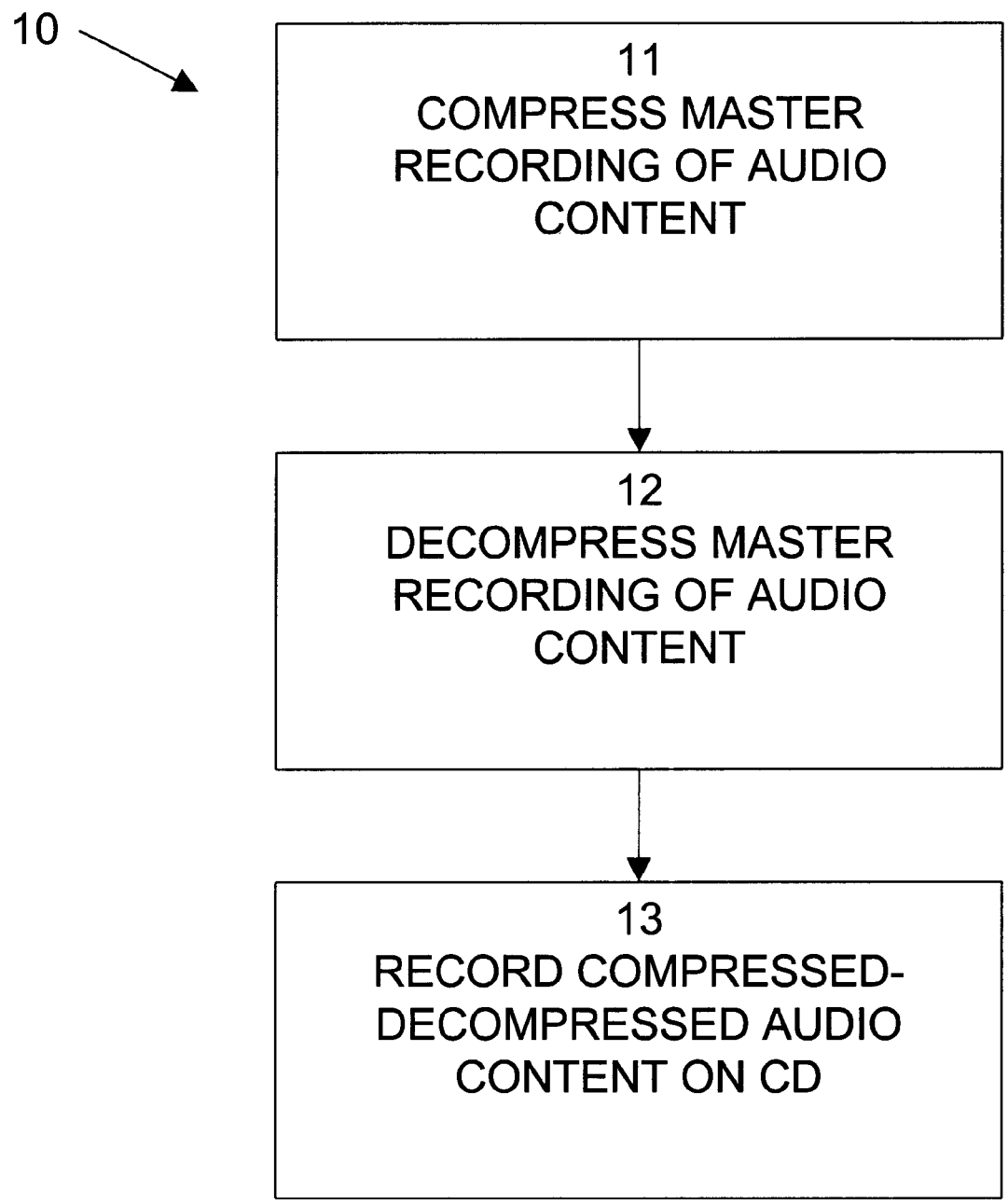

QUALITY DEGRADATION THROUGH COMPRESSION/DECOMPRESSION

CROSS-REFERENCE TO RELATED APPLICATIONS

The present application is related to an application U.S. patent application Ser. No. 08/888,014 entitled "Custom Character-coding Compression For Encoding And Watermarking Media Content" by Jack B. Lacy, Schuyler Quackenbush R. and James H. Snyder, and filed Jul. 3, 1997 with the present application.

BACKGROUND OF THE INVENTION

1. Field of the Invention

The present invention relates to the field of telecommunications. More particularly, the present invention relates to a method for recording media content onto a storage medium.

2. Description of the Related Art

Piracy of audio program material, or content, is a significant problem facing particularly the recording industry. The advent of digital music compact disks (CDs) has meant that perfect copies of audio content are readily available to so-called "pirates," who can reproduce the content without degradation and sell the pirated content at below-market rates. The growth of the Internet has exacerbated the piracy problem, providing such pirates a distribution channel directly to customers who are eager to purchase audio content for a bargain.

Music CDs are manufactured from master content recorded and mixed at a recording studio. Such CDs might contain 500 megabytes of digital audio data representing, for example, 45 minutes of audio program material. Since so much data is required to represent a typical "album" of audio content (e.g., music), distributing such content over the Internet is impractical without using an audio compression technique. Advances in audio compression technology have permitted transmission of compressed audio content over the Internet, with decompression performed by a recipient of such content, with little or no loss of audio content quality.

What is needed is a way control distribution of media content over the Internet for preventing piracy of the media content.

SUMMARY OF THE INVENTION

The present invention provides a method for controlling distribution of media content over the Internet, thus deterring piracy of the media content. The advantages of the present invention are provided by a method for manufacturing a compact disk in which a master version of a media content is first compressed, then decompressed prior to recording the compressed-decompressed media content onto the compact disk. Preferably, the media content is compressed and decompressed using the Perceptual Audio Coder (PAC) compression-decompression algorithm or the Advanced Audio Coder (AAC) compression-decompression algorithm.

BRIEF DESCRIPTION OF THE DRAWING

The present invention is illustrated by way of example and not limitation in the accompanying FIGURE which shows a flow diagram for a compression-decompression process for media content according to the present invention for deterring piracy of the media content.

DETAILED DESCRIPTION

The present invention provides a method for deterring piracy of audio content, but is equally applicable to media content containing video and/or textual content. According to the present invention, audio CDs are made by a process that includes compressing and decompressing audio content prior to recording the content onto CDs for distribution and sale. The content, for example, music, thus stored on such a CD or other storage device, such as a diskette having a magnetic medium, is not the conventional representation of digital music, but instead a representation of content that has been modified by compression and decompression. A CD produced in this manner will sound just like an ordinary CD when it is played in a conventional CD player. However, when the audio content of such a CD is compressed a second time by, for example, a pirate (as an antecedent process to practical transmission of the media content over the Internet, for example) and subsequently decompressed by a customer, the audio quality is substantially degraded.

The sole FIGURE shows a flow diagram for a compression-decompression process 10 for media content according to the present invention for deterring piracy of the media content. At step 11, the audio content is compressed using a well-known audio compression algorithm, such as the Perceptual Audio Coder (PAC) algorithm or the Advanced Audio Coder (AAC) algorithm. At step 12, the compressed audio content is decompressed using the appropriate decompression algorithm. At step 13, the compressed-decompressed audio content is recorded onto a CD subsequent distribution and sale.

While the present invention has been described in connection with media having an audio content, it will be appreciated and understood that the present invention is applicable to media having audio content, such as music and/or speech, and/or images, and/or video, and/or textual content, and that modifications may be made without departing from the true spirit and scope of the invention.

What is claimed is:

1. A method for manufacturing a compact disk, the method comprising the steps of:

compressing media content using a lossy compression algorithm;

decompressing the compressed media content using a corresponding decompression algorithm, so that when the media content is again compressed and decompressed, a quality of the media content is substantially degraded so as to deter a piracy of the media content; and recording the compressed-decompressed media content onto the compact disk.

2. The method according to claim 1, wherein the media content comprises a master media content.

3. The method according to claim 2, wherein the compression and decompression algorithms comprise a Perceptual Audio Coder compression-decompression algorithm.

4. The method according to claim 2, wherein the compression and decompression algorithms comprise an Advanced Audio Coder compression-decompression algorithm.

* * * * *